United States Patent [19]
Sillince et al.

[11] Patent Number: 5,897,828
[45] Date of Patent: Apr. 27, 1999

[54] METHOD AND APPARATUS FOR THE MANUFACTURE OF DUCKBILL VALVES

[75] Inventors: Mark Erich Sillince, Bedfordshire, United Kingdom; Erwin Anton Rosens, Alphen a/d Rijn, Netherlands; Karl Mondszein, Nottinghamshire, United Kingdom

[73] Assignees: Whitbread, PLC, United Kingdom; Heinekin Technical Services, B.V., Netherlands; Lawson Mardon Plastics, United Kingdom

[21] Appl. No.: 08/793,403
[22] PCT Filed: Aug. 14, 1995
[86] PCT No.: PCT/GB95/01910
§ 371 Date: May 14, 1997
§ 102(e) Date: May 14, 1997
[87] PCT Pub. No.: WO96/05458
PCT Pub. Date: Feb. 22, 1996

[30] Foreign Application Priority Data

Aug. 15, 1994 [GB] United Kingdom ............... 9416452

[51] Int. Cl.⁶ .................................................. B29C 43/22
[52] U.S. Cl. ..................... 264/504; 264/573; 264/154; 83/53; 83/177
[58] Field of Search ...................... 264/504, 573, 264/154; 425/446, 404, 445, 308, 315; 83/53, 177

[56] References Cited

U.S. PATENT DOCUMENTS

| | | | |
|---|---|---|---|
| 2,032,923 | 3/1936 | Eldridge | 264/504 |
| 3,226,527 | 12/1965 | Harding | 83/177 |
| 3,257,026 | 6/1966 | Taylor | 220/89 |
| 3,266,355 | 8/1966 | Williamson | 83/177 |
| 3,805,649 | 4/1974 | Hester | 83/177 |
| 5,261,459 | 11/1993 | Atkinson et al. | 137/846 |
| 5,620,639 | 4/1997 | Stevens et al. | 264/504 |

FOREIGN PATENT DOCUMENTS

| | | |
|---|---|---|
| 0 139 347 | 5/1985 | European Pat. Off. . |
| 0 380 251 | 8/1990 | European Pat. Off. . |
| 2 243 589 | 4/1975 | France . |
| 2 585 347 | 6/1986 | France . |
| WO 94/13987 | 6/1994 | WIPO . |

OTHER PUBLICATIONS

International Search Report, Dec. 8, 1995.

*Primary Examiner*—Jan H. Silbaugh
*Assistant Examiner*—Edmund H. Lee
*Attorney, Agent, or Firm*—Sughrue, Mion, Zinn, Macpeak & Seas, PLLC

[57] ABSTRACT

A method and apparatus for manufacture of duckbill valves in which the opposed lips of the valve are split by applying a high fluid pressure inside the valve. This pressure causes the valve to balloon and burst. Preferably, the valve is supported over all of its outer surface except the end to be split by a die. The system is particularly suited to duckbill valves made of thermoplastic elastomer.

10 Claims, 2 Drawing Sheets

METHOD AND APPARATUS FOR THE MANUFACTURE OF DUCKBILL VALVES

BACKGROUND OF THE INVENTION

The present invention relates to a method of manufacturing duckbill valves, and more particularly to a method of splitting such valves.

Duckbill valves are non-return valves which have a generally tubular body portion, from which two opposed lips extend. The opposed lips contact each other at the ends away from the tubular body. When the fluid pressure at the tubular end of the valve exceeds that outside the lips, the opposed lips open, allowing fluid to flow forwards through the valve. When the fluid pressure is greater outside the lips than inside the tubular body, the lips are pressed tightly in contact with one another, by the fluid pressure, and so prevent fluid from flowing backwards through the valve.

Cross-linked polymer duckbill valves are formed by compression transfer moulding and the polymer is cross-linked in the mould with the opposed lips integrally formed with each other, being joined by a land. The cross linking of the polymer results in an excessive cycle time.

DESCRIPTION OF THE PRIOR ART

A number of methods are known for separating the opposed lips of such moulded valves. One method is to use a laser to ablate the land between the two lips. The problem with this method is that the laser removes material and creates a permanent gap between the opposed lips. The valve is therefore liable by leak in the backwards direction.

Another method is to shear the land between the two lips. Using this method, a chisel point is inserted through the tubular body of the valve, and contacts the inside of the land area between the two lips. The outside end of the lips is supported on a rubber pad. By applying pressure to the chisel point, the cross-linked polymer material is compressed between the chisel point and pad. If the pressure is applied rapidly enough, the material shears with the creation of a brittle fracture split to separate the two lips. Although the resulting split may not be flat, for cross-linked polymers, there is an exact male-female match, and therefore a good seal can be achieved with no leakage in the backwards direction. A problem with this method is that the pad needs frequent replacement as it is cut and damaged by the action of the chisel point.

Recently, it has been proposed to manufacture duckbill valves from thermoplastic elastomer (TPE) For such valves, the shearing method of splitting is unsatisfactory. Due to the elastic nature of TPE, a brittle fracture is not obtained with a chisel point. Instead, the material tears, and accordingly there is not an exact correspondence between the opposed lips. This results in the valves leaking in the backwards direction at low pressure.

SUMMARY OF THE PRESENT INVENTION

According to a first aspect of the present invention, a method of forming a duckbill valve includes the steps of moulding a valve with its lips joined by a land and subjecting the inside of the valve to a fluid pressure, to split the lips of the valve.

By applying fluid pressure to the inside of the valve, the land joining the lips balloons and bursts thereby separating the lips in such a way that the opposed faces are an exact male-female match. The surface characteristics of the lips so formed suggest once again that the lips are separated by a brittle fracture.

Preferably, substantially all the outer surface of the valve other than the outside of the lips is supported during splitting. By supporting the outside of the valve, it is ensured that only the land between the two lips splits and that the valve does not split at any other point, for example through its side.

Although the duckbill valve may be made of a cross-linked polymer valve, it is preferred that the valve is made from TPE, and more preferably the valve is made of styrene-ethylene-butylene-styrene block copolymer (SEBS).

The fluid pressure may be a blast of air, or other gas or liquid. It is preferred that the fluid is inert so that it does not react with the valves, and is free from bacteria which may remain on the valve.

According to a second aspect of the present invention, an apparatus for splitting a duckbill valve comprises a die shaped to support a valve to be split, and means to supply pressurised fluid to the inside of a valve supported in the die.

Preferably, the apparatus supports substantially all of the other surface of the valve, other than the end of the lips. This ensures that the valves will split through the end of the lips. It is prefered that the apparatus has a plurality of dies for supporting a plurality of valves, and includes a manifold for connecting the air or other fluid to the inside of each valve. In this case, preferably a small cavity is provided under each valve. In this way, immediately after the lips of a valve have been separated, the cavity beneath that valve pressurises, and further fluid does not escape through the split valves so maintaining substantially the fluid pressure available for splitting the remaining valves.

It is beneficial to include a pressure sensor in the cavity below each valve to detect an increase in pressure resulting from the lips being split. A controller is preferably included to monitor the pressure sensors, and to maintain the fluid pressure to the valves until all are split, or to reject all or any of the valves if they are not all split within a predetermined period. The fluid may be air or other gas, or may be a liquid.

DETAILED DESCRIPTION OF A PREFERRED EMBODIMENT

Figure 1:
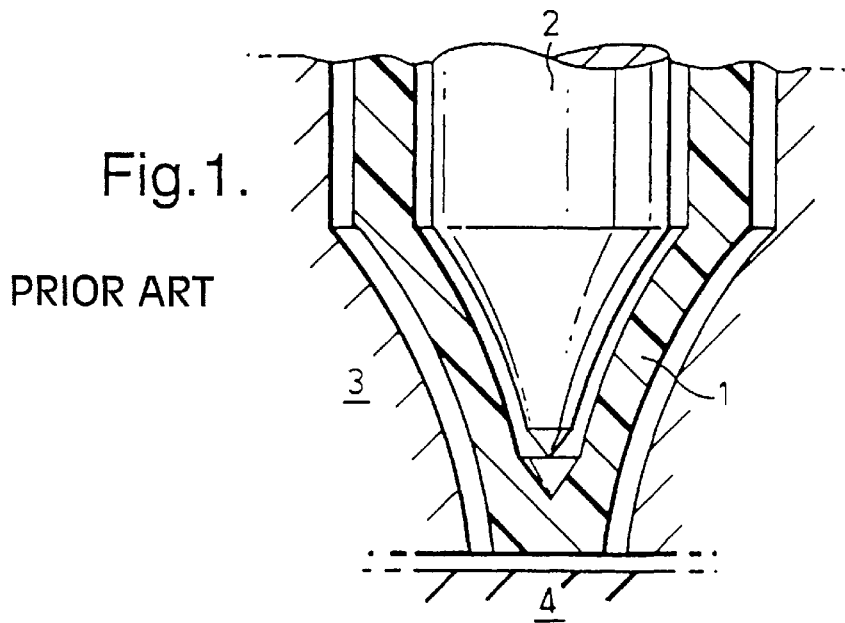
FIG. 1 shows the splitting of a duckbill valve by a shearing process.

FIG. 1 shows a conventional method of splitting a duckbill valve 1 using a chisel cutter 2. The valve 1 is supported by a die 3, so that the inner surface of the die 3 closely corresponds to the outer surface of the valve 1. A chisel cutter 2 is inserted through a tubular portion of the body of the valve 1, and pressure is applied to the chisel 2 whilst in contact with a connecting land between two opposed lips. The blade of the chisel cutter 2 conforms generally with the inside shape of the duckbill valve 1 The die 3 and valve 1 are supported on a rubber mat 4. By rapidly increasing the pressure on the inside of the duckbill valve 1 by quickly pushing down on the chisel cutter 2, a high pressure is exerted on the land between the lips over a very small area causing the material connecting the two lips of the valve 1 to shear. When this technique is applied to a TPE valve, rather than to a cross-linked polymer valve, instead of a brittle fracture occurring, the material connecting the two lips tears. As a result of this tearing, there is not an exact correspondence match between the opposed lips, and therefore the valve 1 leaks in the backwards direction at low pressure.

Figure 2:
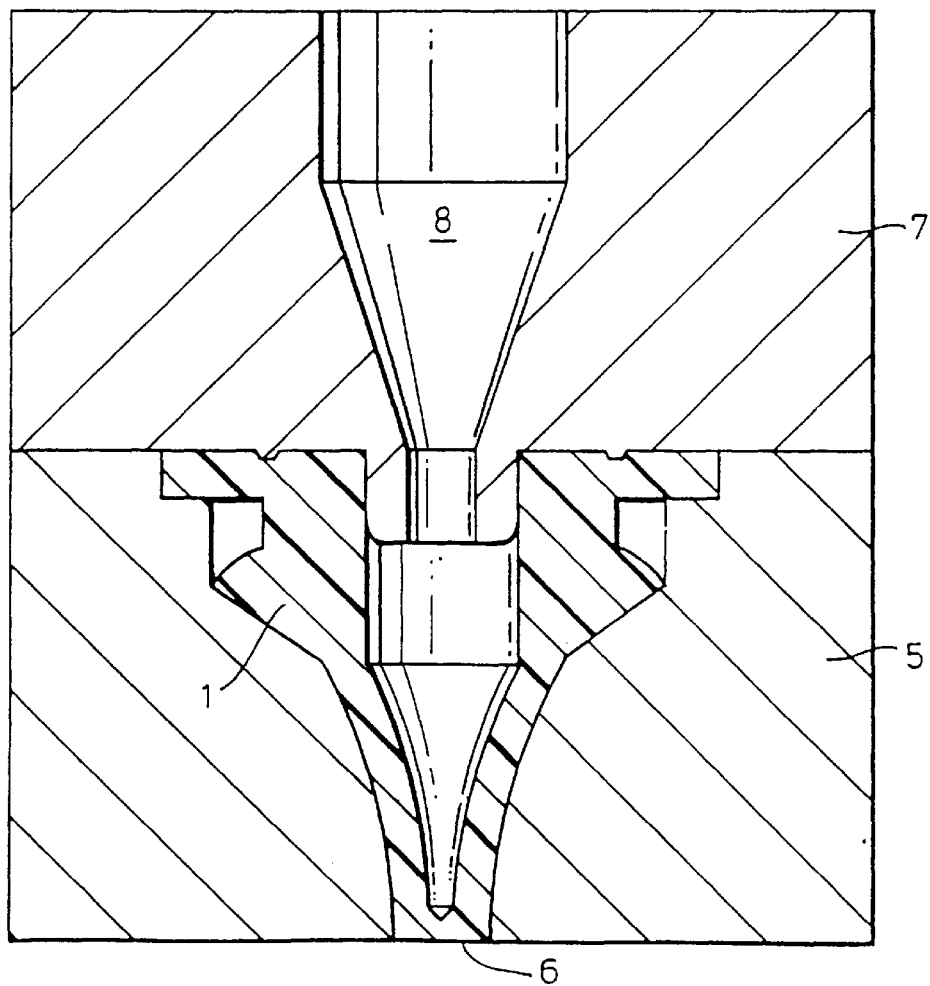
FIG. 2 shows a method of splitting a duckbill valve by an air splitting process; and, FIG. 3 shows a multi-die jig for air splitting.

FIG. 2 shows the method of the present invention. In this case, the valve 1 is supported in a die 5 which is in intimate contact with the entire exterior of the valve 1, other than the end portion 6 where the two lips are joined. This end portion 6 is open. A plate 7 is clamped over the valve 1 to hold it in place, and to create an air tight seal within the interior of the valve 1. A jet hole 8 is provided in the plate 7 through which a blast of air can be provided to the interior of the valve 1. This high pressure within the valve 1 results in the land in the valve 1 ballooning, until it bursts, splitting the land and separating the lips. Due to the intimate contact between the die 5 and the other surface of the valve 1 with the exception of the end 6 at which the lips are connected, it is only the land between the lips which splits. The rapid splitting of the valve 1, and the controlled position of the split by the die 5, ensures that the split between the two opposed lips of the valve has an exact male-female match, and therefore there is no leakage of the valve 1. This applies for both TPE and cross-linked polymer valves 1.

For a duckbill valve made from a styrene-ethylene-butylene-styrene block copolymer such as Evoprene G 968, having a land thickness of 0.25 mm and a lip wall thickness of 0.5 mm, a fluid pressure of 800 to 1000 kPa for a duration of 0.1 to 0.2 seconds is required to split the lips satisfactorily. Whilst the described example requires a blast of air to form the fluid pressure, other fluids may be used, for example carbon dioxide, nitrogen or other gas, or liquids, providing that the fluids are sterile if the valve is to be used with food or drink.

It is not necessary that the valves are intimately supported on all outer surfaces other than the end of the lips. If the land area is of reduced thickness than the remainder of the valve, then the increase in pressure within the valve will cause the valve to split between the lips as this is the weakest point.

Figure 3:
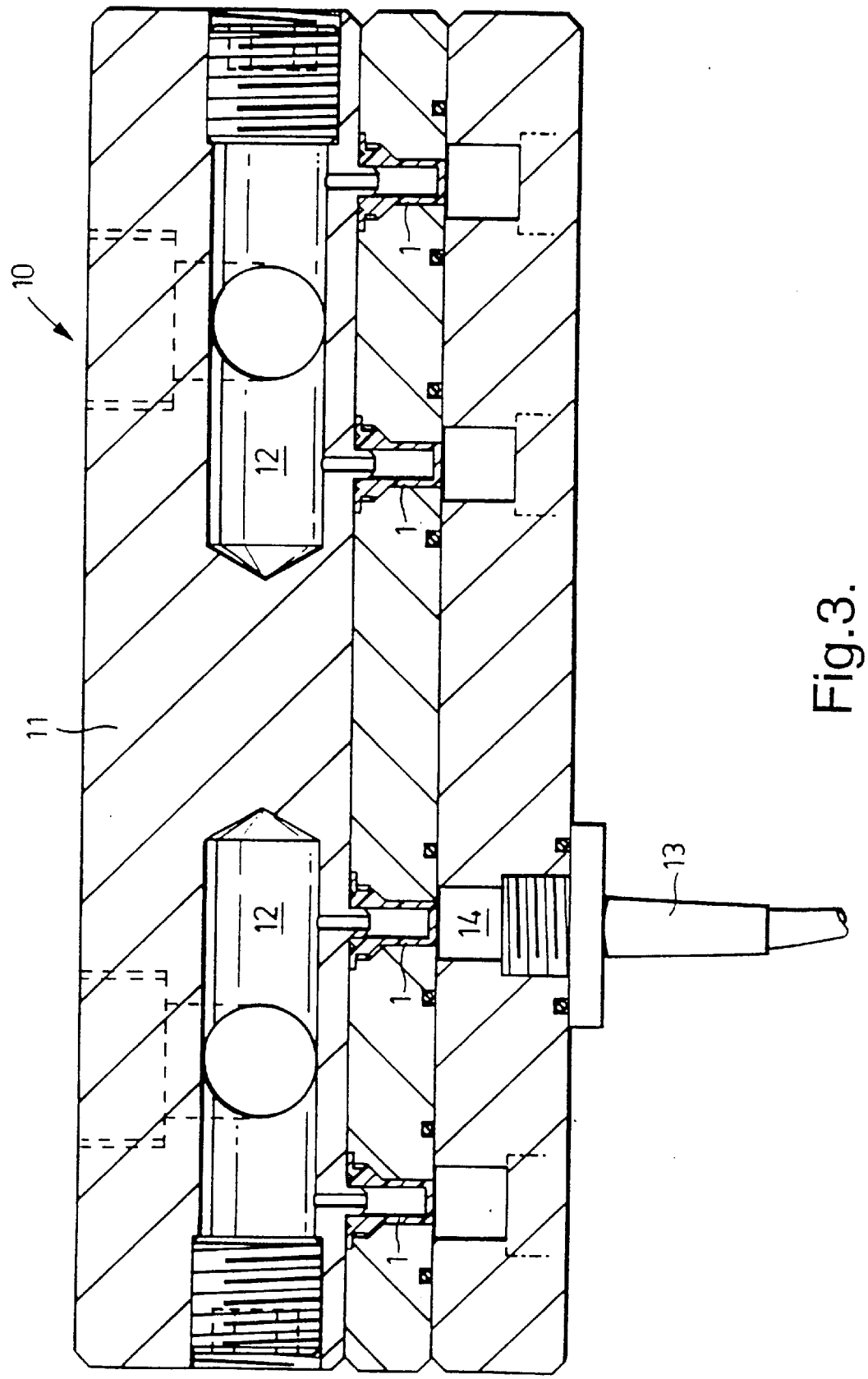

FIG. 3 shows a multi-valve die 10 by which a large number of valves 1 may be split simultaneously. Each valve 1 is positioned in a recess within the die, with the inner surface of each die 10 in intimate contact with the exterior of the valve 1. A Covering member 11 is placed over the top of the die 10 which holds each valve 1 in position. The covering member 11 includes a manifold 12 which directs a blast of air from an air supply (not shown) to the interior of each valve 1. A pressure switch 13 is arranged in a recess 14 below each of the valves 1. In the Figure, only one pressure switch 13 is shown. By supplying a blast of air, the pressure in each valve 1 is rapidly increased, resulting in the splitting of each valve 1. The pressure switch 13 provided in each recess 14 below each valve 1 detects when the lips have split, and this ensures that all valves have been split.

When all valves 1 have been split, the pressure is vented, the die 10 is opened, and the split duckbill valves 1 ejected.

What is claimed is:

1. A method of forming a duckbill valve comprising the steps of: molding a duckbill valve with its lips joined by a land; and subjecting an inside of the valve to a fluid pressure to split only the land and thereby separate the lips of the valve such that opposed faces of the lips as separated are a male-female match so as to prevent fluid from flowing backward through the valve.

2. A method of forming a duckbill valve according to claim 1, in which an outer surface of the valve other than the lips is supported during splitting.

3. A method of forming a duckbill valve according to claim 1, in which the valve is made from thermoplastic elastomer (TPE).

4. A method of forming a duckbill valve according to claim 3, in which the valve is made of styrene-ethylene-butylene-styrene block copolymer (SEBS).

5. A method of forming a duckbill valve according to claim 1, in which the fluid pressure is a blast of inert gas.

6. An apparatus for splitting a duckbill valve according to a method comprising the steps of: molding a duckbill valve with its lips joined by a land; and subjecting an inside of the duckbill valve to a fluid pressure to split only the land and thereby separate the lips of the duckbill valve such that opposed faces of the lips as separated are a male-female match so as to prevent fluid from flowing backward through the duckbill valve, the apparatus comprising: a die shaped to support the duckbill valve to be split, said die supporting said duckbill valve over substantially all of an outer surface of the duckbill valve except at a distal end thereof, at an area at which the land is to be split; and means for supplying pressurised fluid to the inside of the duckbill valve supported in the die.

7. An apparatus according to claim 6, including a plurality of dies for supporting a plurality of valves, and includes a manifold for connecting the pressurised fluid to the inside of each valve.

8. An apparatus according to claim 7 further comprising a small cavity under each valve to prevent the pressurised fluid from escaping through the split valves, thereby substantially maintaining the fluid pressure available for splitting the remaining valves.

9. An apparatus according to claim 8, further including a pressure sensor in the cavity below each valve to detect an increase in pressure resulting from the lips being split.

10. An apparatus according to claim 9, further comprising a controller to monitor the pressure sensors, and to maintain the pressure to the valves until the sooner of determining that all the valves are split and a pre-determined period to reject all or any of the valves if they are not all split within the pre-determined period.

* * * * *